United States Patent
Hörbinger et al.

(10) Patent No.: US 8,854,469 B2
(45) Date of Patent: Oct. 7, 2014

(54) METHOD AND APPARATUS FOR TRACKING PERSONS AND LOCATIONS USING MULTIPLE CAMERAS

(75) Inventors: Oliver Hörbinger, Baden (AT); Klemens Kraus, Vienna (AT); Robert Röhr, Vienna (AT); Florian Matusek, Vienna (AT); Stephan Sutor, Perchtoldsdorf (AT)

(73) Assignee: Kiwi Security Software GmbH, Vienna (AT)

( * ) Notice: Subject to any disclaimer, the term of this patent is extended or adjusted under 35 U.S.C. 154(b) by 636 days.

(21) Appl. No.: 12/994,803
(22) PCT Filed: May 19, 2009
(86) PCT No.: PCT/AT2009/000206
§ 371 (c)(1), (2), (4) Date: Apr. 11, 2011
(87) PCT Pub. No.: WO2009/143542
PCT Pub. Date: Dec. 3, 2009

(65) Prior Publication Data
US 2012/0033083 A1 Feb. 9, 2012

(30) Foreign Application Priority Data
May 28, 2008 (AT) ................................. A 858/2008

(51) Int. Cl.
*H04N 5/335* (2011.01)
*G06T 7/20* (2006.01)
*H04N 7/18* (2006.01)
*G01S 15/89* (2006.01)

(52) U.S. Cl.
CPC .............. *G06T 7/2053* (2013.01); *H04N 7/181* (2013.01)
USPC ........................................................ 348/159

(58) Field of Classification Search
None
See application file for complete search history.

(56) References Cited

U.S. PATENT DOCUMENTS 5,930,740 A    7/1999 Mathisen
6,760,054 B1 *  7/2004 Okuyama ..................... 347/234

(Continued)

FOREIGN PATENT DOCUMENTS

WO   WO 2005/050972 A2   6/2005
WO   WO 2006/046021 A1   5/2006

OTHER PUBLICATIONS

Bhandarkar et al.: "Fast and Robust background Updating for Real-time Traffic Surveillance and Monitoring", in: Computer Society IEEE, 2005.

(Continued)

*Primary Examiner* — Dave Czekaj
*Assistant Examiner* — Kehinde O Abimbola
(74) *Attorney, Agent, or Firm* — Henry M Feiereisen LLC

(57) ABSTRACT

In a method for locating patterns of movement in a first digital video signal, wherein the first digital video signal comprising at least indirectly succeeding individual digital images is analyzed in real time, it is proposed for the locating of patterns of movement in a first digital video signal, during the occurrence of larger moving object volumes in real time, to assign at least a first location-changing foreground region in a first individual image in a predefined manner with a predefinable number of first markings, to subsequently determine the relative movement of the first markings between the first individual image and a subsequent second individual image, to subsequently associate each of the first markings with a predefinable first environment, to assign the first and/or at least one second location-changing foreground region in a predefined manner with a predefinable number of second markings, to remove the second markings disposed inside intersecting regions of a predefinable number of intersecting first environments, to subsequently determine the relative movement of the first and second markings between the second individual image and a subsequent third individual image, and to output the relative movements of the first and/or second markings as a first pattern of movement.

11 Claims, 8 Drawing Sheets

(56) References Cited

U.S. PATENT DOCUMENTS

| | | | |
|---|---|---|---|
| 7,151,562 B1 | 12/2006 | Trajkovic | |
| 2003/0062997 A1* | 4/2003 | Naidoo et al. | 340/531 |
| 2003/0107649 A1* | 6/2003 | Flickner et al. | 348/150 |
| 2005/0078853 A1 | 4/2005 | Buehler et al. | |
| 2005/0089194 A1 | 4/2005 | Bell | |
| 2010/0033574 A1* | 2/2010 | Ran et al. | 348/159 |
| 2011/0285858 A1* | 11/2011 | Chen et al. | 348/187 |

OTHER PUBLICATIONS

Collins et al.: "A System for Video Surveillance and Monitoring", in: Carnegie mellon University, 2000.

Fleck et al.: "3D Surveillance—A Distributed Network of Smart Cameras for Real-Time Tracking and its Visualization in 3D", in: Computer Society IEEE, 2006.

Hua et al.: "Measurement integration under inconsistency for robust tracking", in: Computer Society IEEE, 2006.

López et al.: "Multi-Person 3D Tracking With Particle Filters on Voxels", in: IEEE Proc ICASSSP, 2007.

Olson et al.: "Moving Object detection and Event Recognition Algorithms for Smart Cameras", in: Texas Instruments Research and Developments, Jan. 2007.

Horaud et al.: "An Analytic Solution for the Perspective 4-Point Problem", in: Computer Vision, Graphics and Image Processing, vol. 47, 1989, pp. 33-44.

Sebe et al.: "3D Video Surveillance with Augmented Virtual Environments", in: IWVS, Int. Workshop on Video Surveillance, Nov. 2-8, 2003, pp. 107-112.

Toklu et al.: "2-D Mesh-based Synthetic Transfiguration of an Object with Occlusion", in: Acoustics, Speech and Signal Processing IEEE, Apr. 2007.

* cited by examiner

METHOD AND APPARATUS FOR TRACKING PERSONS AND LOCATIONS USING MULTIPLE CAMERAS

CROSS-REFERENCES TO RELATED APPLICATIONS

This application is the U.S. National Stage of International Application No. PCT/AT2009/000206, filed May 19, 2009, which designated the United States and has been published as International Publication No. WO 2009/143542 and which claims the priority of Austrian Patent Application, Serial No. A 858/2008, filed May 28, 2008, pursuant to 35 U.S.C. 119 (a)-(d).

BACKGROUND OF THE INVENTION

The invention relates to a method for identifying movement patterns in a first digital video signal. The invention is also directed to a method for video analysis. The invention further relates to a method for calibrating a PTZ camera. The invention is further directed to a computer program product embodied on a data carrier, and to a video camera arrangement as well as to a security system.

It is known to track moving objects or objects changing their position within a temporally continuous video signal. Well-known methods are, in particular when monitoring or analyzing the movement patterns of larger moving object sets, for example larger numbers of people, disadvantageously very complicated and simultaneously error-prone. With these conventional methods, it is generally not possible to find movement patterns in a first digital video signal in real time, meaning essentially only with a slight time delay relative to the occurrence of the event. It is therefore an object of the invention to provide a method of the aforedescribed type which can obviate the aforementioned disadvantages and enables finding of movement patterns in a first digital video signal in real time with larger sets of moving objects.

SUMMARY OF THE INVENTION

This is attained according to the invention by a method for identifying movement patterns in a first digital video signal which comprises individual digital images arranged to at least indirectly in form a sequence. The method includes the steps of analyzing the first digital video signal in real-time, applying a predetermined number of first markings to at least one position-changing foreground region in a first individual image, determining a relative movement of the first markings between the first individual image and a subsequent second individual image, associating a predetermined first environment with each first marking in one-to-one correspondence, applying a predetermined number of second markings to the first position-changing foreground region or to at least one second position-changing foreground region, or both, removing the second markings arranged within intersecting regions of a predetermined number of intersecting first environments, determining the relative movements of the first and second markings between the second individual image and a subsequent third individual image, and outputting the relative movements of the first markings or the second markings, or both, as a first movement pattern.

In this way, movement patterns can be identified in real time in the presence of larger sets of moving objects in a first digital video signal. In this way, the method of the invention can be implemented with EDP with acceptable hardware complexity. The existing hardware resources are then utilized very effectively.

Many public areas are monitored with video cameras to deter criminals and to solve crimes. The increasing number of video cameras, however, creates a problem in that the large number of recorded pictures can no longer be processed. Continuous visual monitoring of all cameras is not feasible purely due to the required personnel resources considering that in a modern large facility, for example an international airport, several thousand cameras are installed. An increase in the number of cameras, however, is only accompanied by increased security if the recorded video data can be reviewed and evaluated. In particular in security-relevant areas, continuous review and evaluation of the video data is necessary to ensure protection of people and facilities.

It is therefore an object of the invention to provide a method of the aforedescribed type, which can obviate the aforementioned disadvantages, which enables monitoring and controlling of a large number of video cameras with a small number of operators, and which is unaffected by changing backgrounds or illumination.

This is attained according to the invention by a method for video analysis by identifying movement patterns in a first digital video signal which includes individual digital images arranged to at least indirectly in form a sequence. The method includes the steps of analyzing the first digital video signal in real time, determining at least one background region in each individual image, identifying at least one position-changing foreground region in relation to the background region, and generating and transmitting the message to a control location.

Video data can then be automatically analyzed and evaluated, without requiring continuous visual control by an at least human operator. The attention of the operator can then be directed to certain foreground regions, which may represent objects or articles. In this way, even complex video systems having a large number of cameras can be controlled and monitored using a small number of operators. By continuously determining the background, changing backgrounds or changes in the illumination can be identified, without generating error messages relating to a foreground region or an object.

PTZ cameras can be adjusted very precisely towards points in a room. However, for an exact association of recorded objects in a three-dimensional room, the camera position and the actual distances must be exactly known in a recording region of the camera. PTZ cameras are frequently placed at locations which are difficult to access, in order to make their manipulation more difficult. The actual camera position can therefore frequently not be determined by simple distance measurements. In addition, an additional optical calibration of camera image is desirable.

It is an object of the invention to provide a method for calibrating a PTZ camera of the aforedescribed type, which can obviate the aforementioned disadvantages and which enables a simple, rapid and exact determination of the position of the PTZ camera.

This is attained according to the invention by orienting the PTZ camera sequentially towards an origin and towards three endpoints in three-dimensional space, wherein the origin and the three endpoints in conjunction form an orthogonal coordinate system with known distances between the origin and the three endpoints, measuring, for each of the endpoints, three relative angles between the orientation to the origin and to an endpoint, and determining from these relative angles a position of the PTZ camera in three-dimensional space with respect to the orthogonal coordinate system.

In this way, the exact position of the PTZ camera can be easily and quickly determined, making an optical calibration of the camera image possible due to the orthogonality of the coordinate system.

The invention is further directed to a computer program product which can be directly loaded into the internal memory of a computer and which includes software code segments capable of executing the steps of one of the aforedescribed methods, when the computer program product is executed on a computer, as well as a data carrier having stored thereon the afore-described computer program product, making a particularly effective implementation of the methods of the invention possible.

It is an object of the invention to provide a video camera system and a security system of the aforedescribed type which can obviate the aforementioned disadvantages, which can monitor and control a large number of video cameras using a small number of operators, and which are insensitive to changing backgrounds or illumination.

This is attained with the invention with a video camera arrangement having at least one first video camera connected to a first data processing unit and at least one second video camera connected to a second data processing unit, said first and the second video camera recording at least partially an identical region and in conjunction with the first and second data processing units configured to identify at least one of a background region, a position-changing foreground region and a position-changing object, and with a security system incorporating such video camera arrangement.

The video data can be then automatically analyzed and evaluated without requiring the continuous visual control by a human operator. The operator can then direct his attention to particular foreground regions or objects. Even complex video systems with a large number of cameras can then be controlled and monitored by a small number of operators. By continuously determining the background, changing backgrounds or changes in the illumination are identified, without generating erroneous messages regarding an object. The dependent claims, which like the independent claims form also a part of the description, are directed to advantageous embodiments of the invention.

BRIEF DESCRIPTION OF THE DRAWING

The invention will be described in more detail with reference to the appended drawings which merely illustrate preferred embodiments in form of examples.

It is shown in.

DETAILED DESCRIPTION OF PREFERRED EMBODIMENTS

Figure 1:
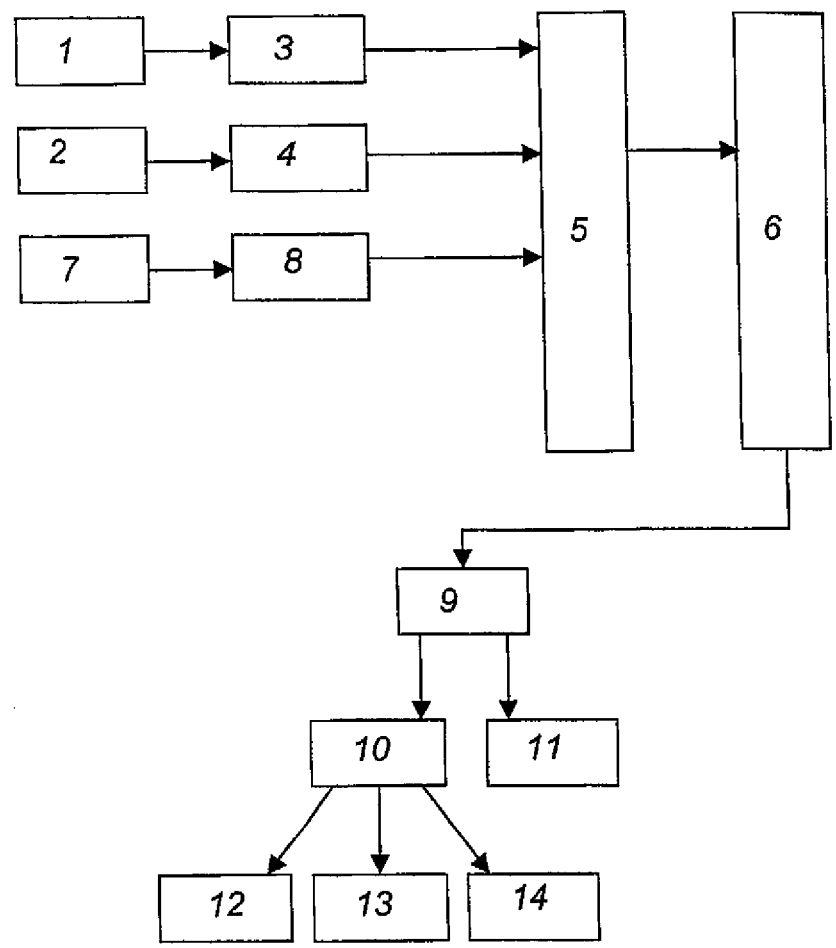
FIG. 1 a block diagram of a video camera arrangement according to the invention.

The subject matter of the invention is related to a method for video analysis, in particular for video monitoring, wherein a first digital video signal, which includes individual digital images which are at least indirectly sequentially arranged, is analyzed in real time, wherein at least one background region is determined in each individual image, wherein at least one position-changing foreground region is identified in relation to the background region, and that subsequently a first message is generated and preferably transmitted to a control location.

In this way, video data can be automatically analyzed and evaluated, without requiring continuous visual control from a human operator. The attention of an operator can then be directed to certain objects. In this way, even complex video systems with a large number of video cameras 1, 2, 16 can be controlled and monitored by a small number of operators. By continuously determining the background, changing backgrounds or changes in the illumination are identified without causing erroneous messages about a foreground region and/or an object.

The method of the invention or a video camera arrangement according to the invention or a security system is designed for use with digital video cameras 1, 2, 16, wherein any type of video camera 1, 2, 16 outputting a digital video signal can be used. The digital video signal is preferably an essentially binary data stream, which includes a number of sequential digital individual images, sometimes also referred to as frames, and which may also include an audio signal. According to the invention, a background or preferably a position-changing foreground region is identified, which may move, appear or disappear. Because an identified foreground region may also be associated with predetermined categories, for example the foreground region may show a person or an item of luggage, or several video signals processed according to the invention may later be combined into a model of a monitored area, the video signals produced by the video cameras may preferably be calibrated. By calibrating the video signals, a point on a video image may also be associated with a point on a plan of the monitored area.

In the following, the preferred calibration of a video signal will be described with reference to an example. Lines which are parallel in the real world intersect in photographic images at vanishing points. Preferably, video cameras employed according to the apparatus of the invention are oriented so that people in the image appear essentially upright, so that the "up-vector" of the video camera 1, 2, 16 is located essentially in the same vertical plane as the viewing direction vector. All vertical lines (columns, door trim, . . . ) of the image then intersect in a vanishing point below the image, because the video cameras 1, 2, 16 have, due to their arrangement on a building ceiling or a pole, mostly a slightly downwardly sloped viewing direction. This vanishing point is referred to as a vanishing_south.

Rectangular (orthogonal) structures frequently appear in surroundings created by humans, in particular inside buildings. Rooms are almost always designed with right angles. If floors or walls have a structured surface, then this surface is frequently also oriented parallel or perpendicular to the walls of the room. These actually parallel lines intersect in the image at vanishing points which are referred to as vanishing_east and vanishing_west. If these three vanishing points are known, for example as a result of a calculation, then three actual lengths in the direction of the vanishing points in the recording area captured by the video cameras 1, 2, 16 must also be known for a calibration of the video signal. The additional calibration of the video signal is preferably performed by using the so-called double-ratio.

As already mentioned, any type of video camera 1, 2, 16 may be employed, in particular stationary video cameras 1, 2, 16 or so-called PTZ cameras 7, with PTZ referring to Pan-Tilt-Zoom. Such PTZ cameras 7 can be pivoted with a motor drive and have a predetermined zoom range. The pan and tilt mechanisms can be adjusted with adequate precision so that predetermined points can be very precisely controlled with such PTZ camera 7. Such PTZ cameras 7 are calibrated by determining first the position of the PTZ camera 7 in three-dimensional space in relation to an orthogonal coordinate system. The PTZ camera 7 is hereby sequentially oriented towards an origin and towards three endpoints in space, which together form an orthogonal coordinate system with known distances between the origin and the endpoints, wherein each of the three relative angles between the orientation onto the origin and onto each of the three endpoints are determined, and wherein the position of the PTZ camera 7 in three-dimensional space with respect to the orthogonal coordinate system is determined from these relatives angles.

The position of the PTP camera 7 is hereby determined by geometric and/or trigonometric calculations. It will only be mentioned at this point that the position of the PTZ camera 7 is located at the intersecting point of three tori, which are formed through rotation of a respective segment of the circle about a respective one of the three orthogonal axes of the orthogonal coordinate system. Because this method is rather complex, the position of the PTZ camera 7 may be determined in three-dimensional space relative to the orthogonal coordinate system through intersection of parallel circles on a surface of a auxiliary sphere which has as its center the origin. This is possible because the rotation axes of the three tori are simultaneously also the axes of the orthogonal coordinate system. The position of the PTZ camera 7 relative to the orthogonal coordinate system can then be quickly and easily determined.

With the method of the invention, at least one background region as well as a first position-changing foreground region are determined in each individual image, wherein the first position-changing foreground region includes all image areas that cannot be associated with the background region, meaning those regions that move within the sequence covered by the first video signal and can therefore not be associated with the background region due to the particularly preferred embodiment of the method of the invention to be described below. It is provided that the values assumed by each individual pixel of a camera image over a defined time interval in the past will be analyzed.

In a method according to the invention, wherein individual images with a predetermined number of pixels are processed, wherein each pixel has at least one value, in particular a grayscale value and/or a color value, the value of a first pixel of a first individual image is compared with a predetermined number of comparison values, the value of one first comparison value from the predetermined number of comparison values is associated with the first pixel, if the value of the first pixel is located within a predetermined tolerance range about the first comparison value, and that a frequency with which the first comparison value occurs is increased by a predetermined first amount, and that the comparison value with the highest frequency of occurrence is associated with the background region. In this way, a dynamic background is determined, which is stable against changes progressing slowly over time or against frequent statistically occurring changes. A background generated or determined in this manner is, for example, stable against lighting conditions that change with the time of day. Moreover, slightly changing regions, for example a tree moving in the wind, are identified as background and hence do not generate an alarm in the control center.

For each pixel of the individual image, a predetermined number of comparison values and their frequency of occurrence can be created or stored. This will now be described in form of an example for a number of five.

When a new frame or individual image of the video signal is provided for processing by the method of the invention, the value of each pixel is compared with the respective, preferably five, comparison values. If the value is within a predetermined tolerance range about one of the preferably five comparison values, then this value is associated with the stored comparison value. As soon as a suitable stored comparison value has been found, the method is interrupted, and the other comparison values are no longer tested.

If the actual value of a pixel can be associated with a stored comparison value, then the frequency of occurrence of this comparison value is increased by a predetermined first amount of, for example, one. As a result, after many frames those stored comparison values which more frequently represent the best approximation of the actual value of a pixel are assigned the greatest frequency of occurrence. By assuming that in a video sequence or a video signal those values of a pixel occur most frequently at a specified location, which are associated with the background region of the individual image (and not with the moving or position-changing foreground regions and/or objects), the stored value for this pixel has the greatest frequency of occurrence which most closely represents the background color or background gray value.

Preferably, if the value of the first pixel is outside predetermined tolerance regions about the comparison values, then the value of the first pixel is associated with the comparison value that has the lowest frequency of occurrence. In this way, the comparison values can be continuously adapted to the changing contents of the video signal.

According to a particularly preferred embodiment of the invention, a maximum value is set for the frequency of occurrence. If the frequency of occurrence of the stored comparison value exceeds this maximum value, then the frequency of occurrence is set to the maximum value. This measure then also defines a learning rate; because a new object appearing in the video signal requires the same number of frames or individual images in order to bring the frequency of occurrence of the associated stored comparison value to the maximum value and therefore establish this stored value as background.

In another preferred embodiment, the frequency of occurrence of each comparison value is reduced by a predetermined second amount after a predetermined number of sequential individual images. This enables continuous "relearning" with the method of the invention. A predetermined number of the subsequent individual images of three would indicate, for example, that for each third received frame the frequency of occurrence of all stored comparison values is reduced by the second amount of, for example, one. The frequency of occurrence of a comparison value which was at the maximum value and was therefore declared to represent the background or background region, it is steadily reduced to the frequency of occurrence of zero unless it is "renewed".

In a modification of the method of the invention, wherein a second individual image is recorded in a predetermined time interval following the first individual image, a position-changing foreground region is preferably determined by subtracting the background region of the first individual image from a background region of the second individual image, with the thus formed difference being associated at least with the first position-changing foreground region.

An object added to a first recording region, which was initially identified as part of the foreground region, will be identified during the continuation of the video signal after a certain time as background or as part of the background region. To identify if such object is added to or removed from a recording region, the method of the invention is preferably executed in parallel several times, for example twice, generating different first amounts. With the two methods executed in parallel, changes are identified and/or defined as background region with different speed. Therefore, a rapid "learning" method and a slow "learning" method are provided. This makes possible an association if an object is added to or removed from the recording region. If an object has been removed, it is with the slow "learning" method still associated with the foreground region, whereas this region is already associated with the background with the rapid "learning" method. If an object has been added, then this object is not yet associated with the foreground region with the slow "learning" method and the respective region is still defined as background region, whereas the object is already associated with the foreground region with the rapid "learning" method.

Particularly preferred, all pixels are evaluated, which are arranged in a geometric structure, for example a rectangle, about an identified foreground region. In this way, a direct comparison with the surrounding background region can be made, thereby reducing the error probability of the method.

Figure 2:
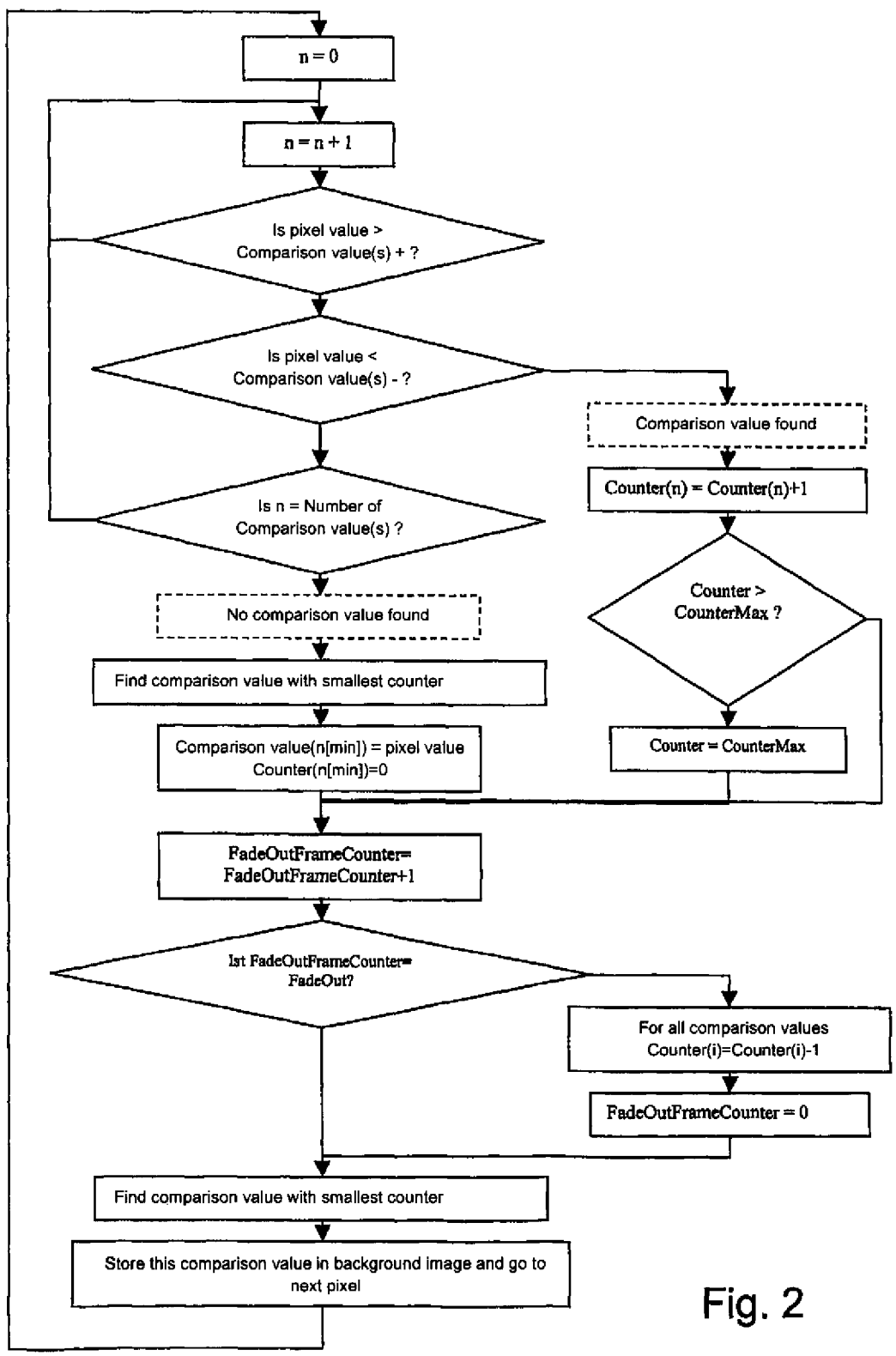
FIG. 2 a process flow diagram of a preferred embodiment of the method of the invention.

FIG. 2 shows a process flow diagram of a particularly preferred embodiment of the aforedescribed method of the invention.

Moreover, individual objects, in particular objects associated due to their shape, for example people, vehicles or moving objects, such as suitcases or luggage carts, should be identified within an identified foreground region, and the identified objects should be described by a video sequence or, as described further below, tracked via several video signals or video sequences from different video cameras 1, 2, 16. The identification of an object and/or the tracking of already identified or recognized objects in a video signal is referred to as tracking, for which tracking methods or so-called trackers are provided. Preferably, within the foreground region position-changing objects are identified with a mean-shift-tracker, and/or their movements are tracked with a mean-shift-tracker or an optical-flow-tracker; however, other trackers or tracking methods can also be provided or used.

The advantages of different trackers or tracking methods can be combined by using a so-called tracker-manager which combines the results from tracking methods executed in parallel and then determines a tracking end result. More particularly, a number of trackers is selected from a group of predetermined trackers for tracking the movement of the first position-changing object, whereafter the movement of the at least one first position-changing object is tracked with each of the selected trackers and a tracking result is determined, and wherein subsequently the tracking results of the trackers with the smallest error probabilities are combined to a tracking end result.

Figure 3:
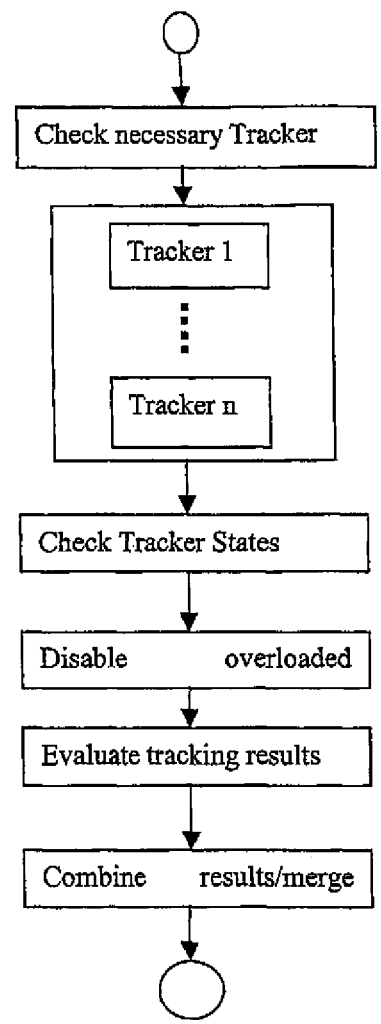
FIG. 3 a process flow diagram of a tracker-manager.

FIG. 3 shows a process flow diagram of such tracker-manager. In a first step, the trackers to be used are selected based on the previous effectiveness and/or error probability obtained until that point in time with an already executed method. In addition, trackers are preferred which have already processed a defined number of preceding frames, in order to increase the reliability of the tracker.

In the next step, the processing steps of the individual trackers are started, wherein these steps can be executed parallel or sequentially in time. The processing step produces n sets of objects which must now be combined to a matching individual end result. This is done in the subsequent steps.

Depending on the tracker, different inputs can affect the effectiveness and reliability of the tracking method, which can lead to erroneous results; one example is an exceedingly large number of people when using the so-called mean-shift-tracker. This can be avoided by preferably defining for each tracker parameters which enable determining an error probability relating to the entire recording region or only to an image segment. If the predetermined error probability is too high, the identified regions for this tracker are not used for the end result. If the error probability has the same magnitude over a predetermined time interval, then the complete processing of this tracker is discontinued for a predetermined time interval.

After this step, the individual objects of the different trackers are evaluated to determine a probability that they represent the same physical object. If it is determined that this is the same physical object with a predetermined probability, then the objects are combined to a single object. The combined objects are used as input parameters for a process flow which is responsible for the temporary association of the objects, i.e., which identified objects in the previous frame are comparable with the identified objects in the current frame.

As already mentioned, any type of tracker or tracking method may be used. Particularly preferred embodiments of two particularly preferred trackers, the mean-shift-tracker and the so-called optical-flow-tracker, will now be described in more detail.

The concepts of the mean shift-tracker are known to a skilled artisan. According to a preferred embodiment, the mean-shift-tracker is applied to so-called difference images. These are individual images without background regions or images which include or visualize only the identified foreground regions. Such difference images have a high contrast which is advantageous when using the mean-shift-tracker and which generates few errors with the mean-shift-tracker.

The mean shift clustering algorithm is applied to the foreground regions appearing in a difference image in order to localize the centers (or centers of gravity) of the individual foreground regions and to thereby determine objects associated by shape. Vectors or gradients which point towards the greatest luminosity are determined for kernels or blocks having a predetermined number of pixels, which each encompass at least part of a foreground region. In this way, individual objects can be identified and tracked in a difference image. Because a conventional mean-shift-tracker is computation-intensive and therefore slow, in one preferred embodiment such mean-shift-tracker is applied by using a so-called integral image. In this way, the otherwise time-consuming computations of the individual gradients can be significantly accelerated, so that the method of the invention can be executed in real-time with acceptable resources.

Conventional mean-shift-trackers have the disadvantage that all pixels have values of identical weight. However, for determining the gradient, pixels in the center of a kernel are advantageously weighted more heavily than those in a marginal region. It is therefore known to weight the pixels within a kernel. Weighting with conventional weighting functions, however, has the disadvantage that the integral image cannot be used, which would otherwise be advantageous for real-time processing. In a modification of the invention, each kernel or block can be weighted with at least one predetermined exponential function. Exponential functions of functions which are similar in different ranges of values, so that the gradient can still be determined from an integral image. By weighting with an exponential function, the advantages of using an integral image can be combined with the advantages of weighting the individual pixels within a kernel.

As described above, vectors or gradients are determined with the mean-shift-tracker which point towards the greatest luminosity. The vectors or gradients have an endpoint, wherein with an ideally behaved mean-shift-tracker the endpoints of all the vectors that can be associated with an object should converge at a point, namely the center or center of gravity, thus making possible the association of individual partial regions of a foreground region with a defined object. Under realistic conditions, with an actually implemented mean-shift-tracker, the endpoints of the vectors rarely overlap in a single point. Instead, these endpoints of the vectors are arranged in a region about the center or the center of gravity. This may wrongly associate individual blocks with an object. It has been shown that the accuracy of the method of the invention can be significantly increased by associating a defined second environment with an endpoint of the vector determined for each block, and by processing these second environments also with the mean shift method or mean-shift-tracker, wherein the aforedescribed preferred embodiments of the mean shift method can be applied. The mean-shift-tracker is here applied to a first intermediate image which is only composed of second environments which may be partially overlapping. In a preferred implementation of the method of the invention in form of a computer program product, the first intermediate image may not displayed or outputted visually, but only described mathematically, and/or may exist only virtually in form of predetermined memory allocations in a computer. In this way, convergence of the so determined new endpoints of the vectors and association of the individual original blocks with a location-changing object can be significantly improved. This significantly improves the efficiency of the mean-shift-tracker.

The optical-flow-tracker is a method which, unlike the mean-shift-tracker, does not attempt to track individual objects in isolation, but rather analyzes a so-called "optical flow". Accordingly, this method still allows to identify movement directions, in particular in situations where individual objects/persons can no longer be discerned due to the information density in the image. It is also not of interest in some situations to track each object individually. Optical-flow-trackers are particularly advantageous when evaluating and tracking the movement of people. As mentioned earlier, conventional trackers are disadvantageously unable to find movement patterns in a first digital video signal in real time, meaning essentially with only a slightly time delay with respect to the occurrence of an event. The invention also relates to a method for finding movement patterns in a first digital video signal, wherein the first digital video signal, which includes individual digital images arranged at least indirectly in sequence, is analyzed in real time, wherein a predetermined number of first markings are provided at least a first position-changing foreground region of a first individual image, wherein subsequently the relative movement of the first markings between the first individual image and a second individual image following the first individual image are determined, wherein then a predetermined first environment is associated with each first marking, wherein a predetermined number of second markings are applied to the first and/or at least one second position-changing foreground region, wherein the second markings, which are arranged inside intersecting regions of a predetermined number of overlapping first environments, are removed, wherein subsequently the relative movement of the first and second markings between the second individual image and a following third individual image are determined, and wherein the relative movements of the first and/or the second markings are outputted as a first movement pattern. This allows identification of movement patterns in a first digital video signal in the presence of larger moving object sets in real time. The method of the invention can then be implemented by EDP with acceptable hardware resources. Existing hardware resources are thereby particularly effectively utilized.

The term "movement pattern" refers preferably to the direction, speed and possibly the acceleration of a position-changing object.

With the method of the invention, markings are applied on the foreground regions which were identified in the first individual image as position-changing. Preferably, foreground regions are identified with the aforementioned method. However, if the first video camera is oriented towards an origin which with a high probability represents an origin of all moving objects or foreground regions appearing in a video signal, for example an access gate for people, then position-changing foreground regions may not be separately identified, and markings may be applied to all regions in an origin region.

First markings are arranged on the first individual image with a predetermined distribution, wherein only the first markings arranged on a position-changing foreground region are further processed. According to the invention, the markings may be arranged with any predetermined distribution on the at least one first foreground region. Preferably, the first and/or second markings are arranged in form of a pattern, preferably uniformly or with a predetermined weight, wherein preferably those image segments in which moving or position-changing objects or foreground regions are expected to occur, are provided with a denser grid of markings.

According to the invention, the relative movement of the first markings between the first individual image and a following second individual image is determined, wherein the relative movements of the first and/or second markings are preferably determined with a method for estimating, in particular for determining, an optical flow in the first video signal, preferably an optical-flow-tracker, in particular an optical-flow-tracker operating according to the Horn-Schunk method or the Kanade-Lucas-Tomasi method.

A first environment formed as a, in particular weighted, rectangle, in particular as a square, or preferably as a weighted conical section, in particular as a circle or an ellipse, is associated with the moved first markings. In a following method step, second markings of the aforedescribed type are again applied to the processed second individual image, wherein new second markings are only arranged on the foreground regions, if there is no intersecting region of a predetermined number of overlapping or intersecting first environments at the respective location at which a second marking is provided. Accordingly, if a second marking should be arranged on a position-changing foreground region, and if this region is already covered by the intersecting region of, for example three, first environments, then this second marking is not applied. The method of the invention is then repeated in form of a loop for the subsequent individual images, starting at the beginning.

Preferably, an error statistics is determined for each marking and for each computed relative movement, and markings with an error statistics exceeding a predetermined limit are removed. In addition, the amount of the relative movement is preferably taken into consideration, and markings having a relative movement less than a predetermined measure are removed. In this way, non-moving markings, for example markings that were wrongly set, are deleted and the complexity for executing the method can be reduced. Additionally, the age of each marking over a predetermined time interval or a predetermined number of sequential individual images is preferably recorded, and markings whose age exceeds a predetermined limit, for example 50 sequential individual images, are removed. In this way, the processed markings can be continuously regenerated which also reduced the complexity for executing the method.

For evaluating the determined movement patterns, at least the second individual image is preferably subdivided into predetermined arrangeable segments having a predetermined shape and size, wherein at least the first movement patterns within each segment are evaluated, and wherein for each segment a segment movement pattern is determined. At least the second individual image, preferably also all additional individual images, is then segmented into predetermined fashion, wherein the shape and size of the segments can be predetermined. Preferably, the segments are matched to the expected image content. As a result, regions in which foreground regions of objects are not expected that could be of interest for an observer are associated with larger segments, whereas regions which need to be analyzed very accurately, are associated with several small regions. Preferably, a directional histogram is established within each such segment, in which each determined movement direction, preferably after being evaluated and/or weighted, is recorded. In this way, it can be prevented that several large determined movement directions result in a segment movement pattern which no longer reproduces the actual movement directions. A rapid but still differentiated evaluation of the movement flow within the first video signal is then possible.

Preferably, at least one first main movement pattern is determined from the first movement pattern and/or from the segment movement patterns. To this end, a directional histogram may be established in which each segment movement pattern, preferably after being evaluated and/or weighted, is recorded. In this way, a global main movement pattern can be determined. Moreover, certain movement directions or objects with certain movement directions are preferably identified within the video signal, for example objects which move opposite to a main movement pattern and which are therefore very fast (running) and/or which move, for example, opposite the direction of travel of an escalator. Such deviating movement patterns raise suspicion for a safety-relevant situation.

In a particular preferred embodiment, the aforedescribed methods can be implemented as a computer program product which may be loaded directly into the internal memory of a computer or may be stored on a data carrier, and which includes software code sections adapted for executing the steps of the method of the invention if the computer program product is executed on a computer. A computer is hereby preferably a device which includes a suitable microprocessor, microcontroller and/or digital signal processor (DSP), as well as the necessary memory and/or a data bus. A microcontroller and/or a digital signal processor may also be implemented within a so-called PLD (programmable logic device) or an FPGA (field programmable gate array). Aside from conventional personal computers and mainframe computers, the computer may also be implemented as a so-called embedded system.

The invention also relates to a video camera arrangement with at least a first and a second video camera 1, 2, wherein the first and the second video camera 1, 2 record at least partially the same region, wherein the first video camera 1 is connected to a first data processing unit 3 and the second video camera 2 is connected to a second data processing unit 4, in particular including at least one digital signal processor, for identifying a background and/or a position-changing foreground region and/or an object. Such video camera arrangement is particularly well-suited for implementing a method of the invention, because a respective data processing unit 3, 4 is associated with each video camera 1, 2. The high computing power required for implementing the method of the invention can hence be provided by providing separate data processing units 3, 4, 8. The data processing units 3, 4, 8 can also be used to calibrate the individual video cameras 1, 2, 7.

In a modification of the invention, the first and the second data processing unit 3, 4 are preferably connected to a first central data processing unit 5, for creating a model 18 of the regions recorded by the first and second video camera 1, 2, wherein the first central data processing unit 5 is preferably connected to a data store 6. In this way, the data acquired by each of the video cameras 1, 2, 7, 16 can be combined in a simple and understandable model 18.

FIG. 1 shows a block diagram of a particularly preferred arrangement, wherein additional components are provided and illustrated. A first and second video camera 1, 2 are each connected to a corresponding first or second data processing unit 3, 4. Also provided is a PTZ camera 7 which is connected to a third data processing system 8 which in addition to implementing the method of the invention can also be used to calibrate and control the PTZ camera 7. Any number of additional video camera 16 may be provided in addition to the illustrated three video cameras 1, 2, 7, whereby even an arrangement with several thousand video cameras 1, 2, 7, 16 may be implemented. In addition to the aforedescribed video cameras 1, 2, 7, 16, there can also be provided video cameras 1, 2, 7, 16 which already include an integrated data processing unit 3, 4, 8. In addition, so-called mobile monitoring units can be provided, which each include at least one video camera 1, 2, 7, 16 as well as a data processing unit 3, 4, 8 and a data store 6, and which can only be read when triggered by an event, for example a terror attack. In addition, each combination of the aforedescribed arrangements with different video cameras 1, 2, 7, 16 can be implemented, for example a combination of static video cameras 1, 2 with PTZ cameras 7.

The data processing units 3, 4, 8 of the individual video cameras 1, 2, 7, 16 are connected to a central data processing unit 5.

In this context, at least two digital video signals, which are each associated with an at least partially overlapping recording region, can be merged into a model 18 of the recording region 15 which is described by all the video signals. The model 18 can be outputted, in particular displayed, wherein the model 18 is preferably created as a three-dimensional model 19. Calibrating the individual video cameras 1, 2, 7, 16 may be advantageous for combining the video signals determined by the individual video cameras 1, 2, 7, 16, and more particular the information indicating if regions of an image belong to a background region or a foreground region, and for tracking of the detected objects across the recording region covered by one of several video cameras 1, 2, 7, 16. In addition, a global coordinate system is required for connecting the individual video signals and/or the data extracted from or obtained from these video signals in a single model 18. The user of such video camera arrangement can then navigate quickly and intuitively in a video-monitored region, wherein the user always receives those data which are very likely of greatest interest for the user.

Figure 5:
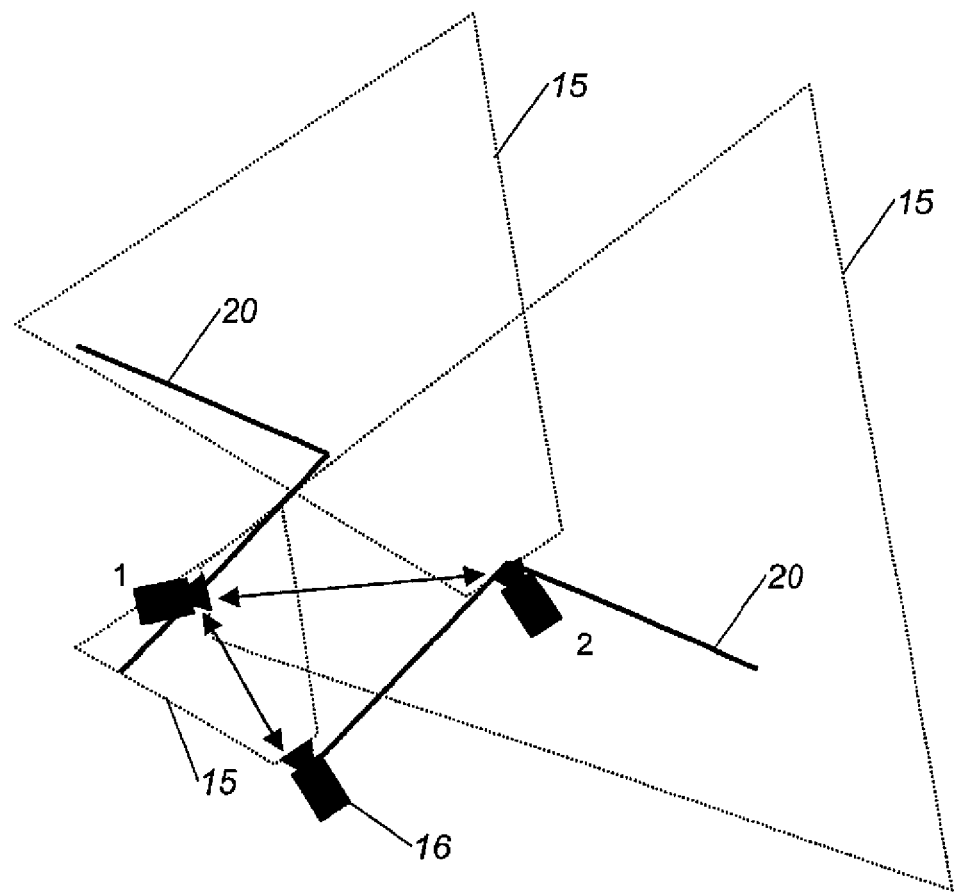
FIG. 5 a plan view of a video camera arrangement with three video cameras.
Figure 6:
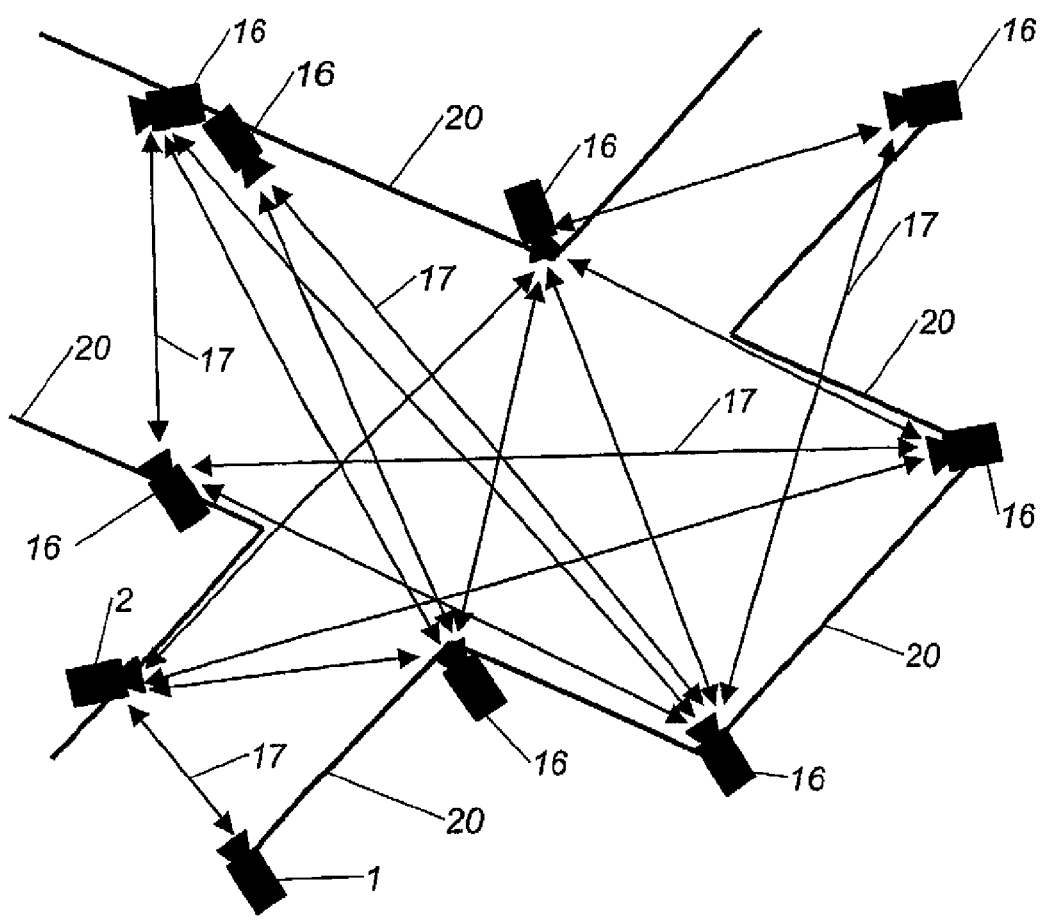
FIG. 6 a plan view of a video camera arrangement with ten video cameras.
Figure 7:
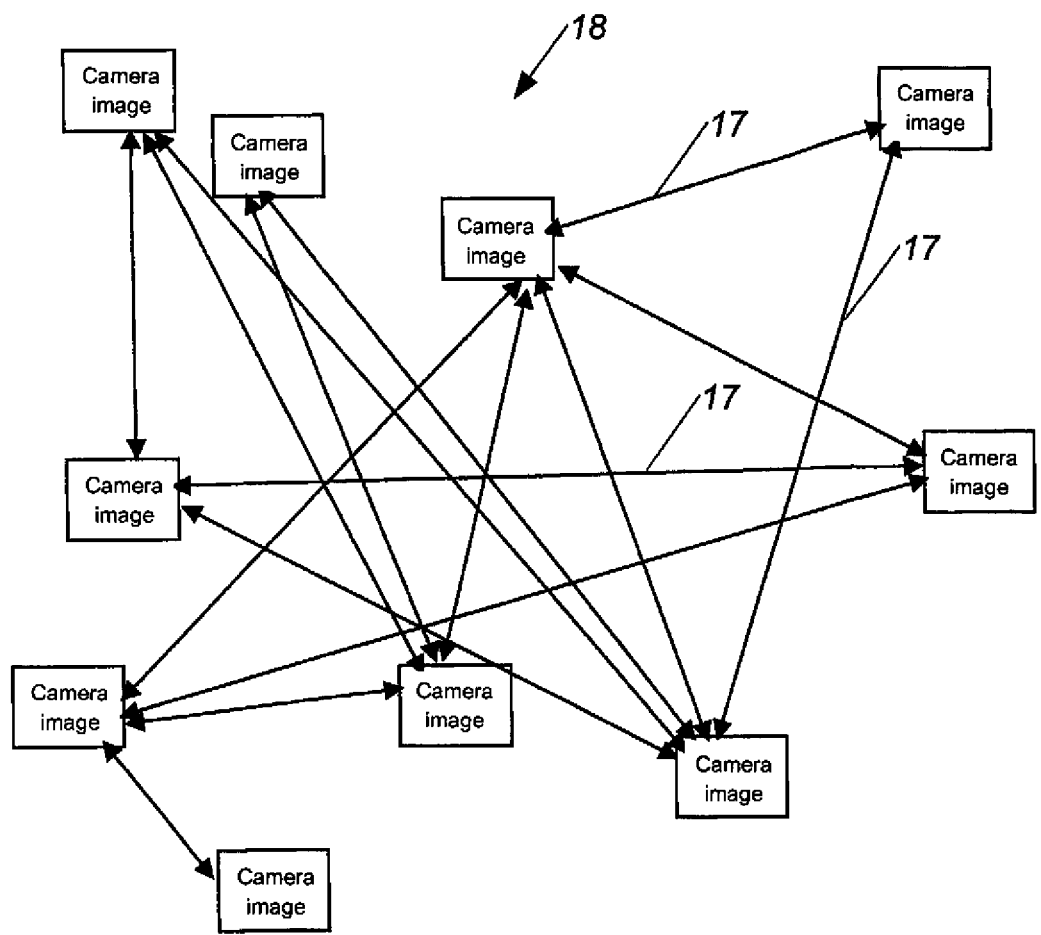
FIG. 7 a model of the plan view according to FIG. 6.

A model 18 of the entire region monitored by the video cameras 1, 2, 7, 16 is created in the first central data processing unit 5 from the data of the individual data processing units 3, 4, 8. FIG. 5 shows an arrangement with the video cameras 1, 2, 16 in a schematic plan view, wherein the recording region 15 and distinguished building corners 20 also shown in addition to the video cameras 1, 2, 16. FIG. 6 shows an arrangement with ten video cameras 1, 2, 16, wherein the double arrows 17 each indicate overlapping recording regions. For sake of clarity, not all of the double arrows have been completely labeled. The video cameras 16 shown in addition to the first and second video cameras 1, 2 in FIGS. 5 and 6 have the common reference symbol 16. FIG. 7 shows a model 18 of the arrangement according to FIG. 6, wherein the individual video cameras 1, 2, 16 shown in the plan view of FIG. 6 have been replaced by the images recorded by the respective video cameras 1, 2, 16.

Figure 4:
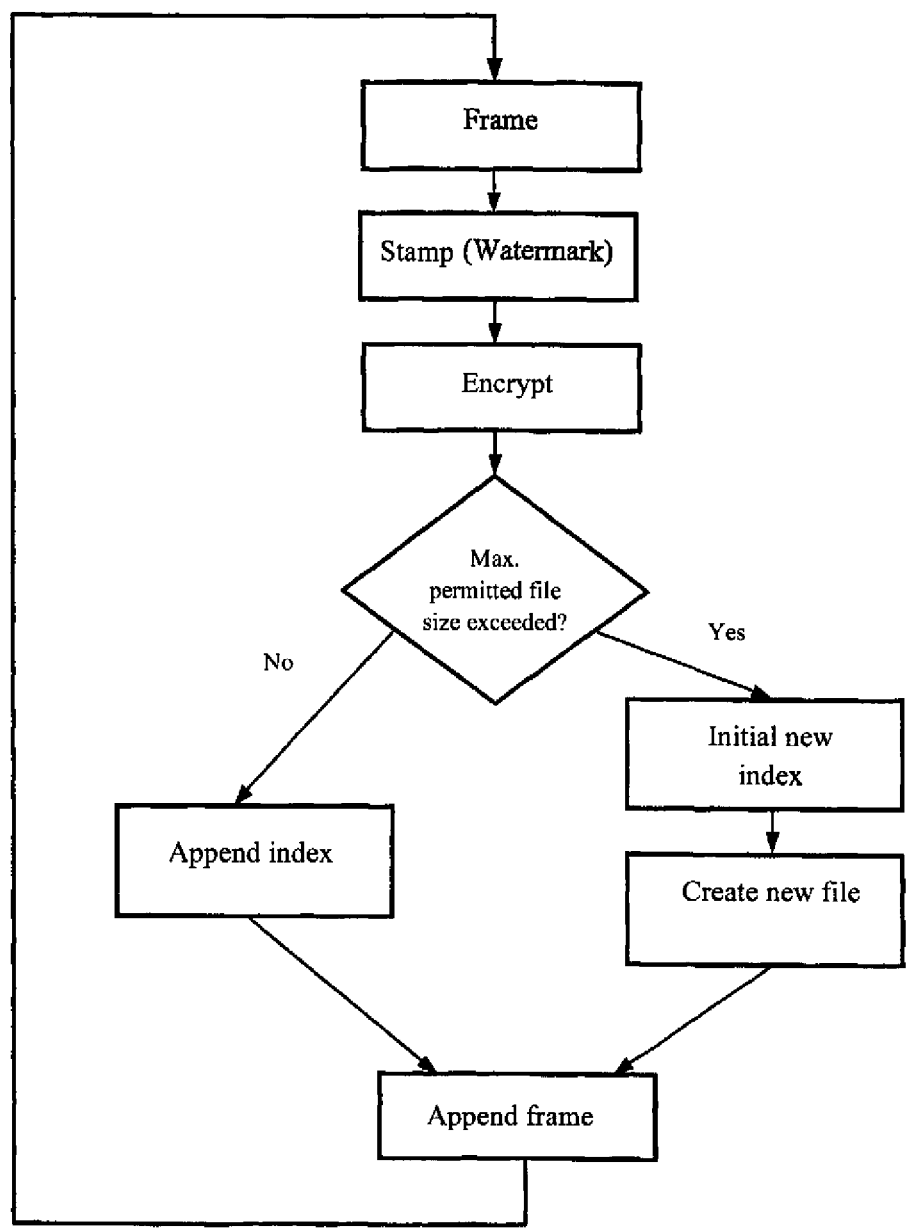
FIG. 4 a process flow diagram of a preferred method for encrypted storage of individual video frames.

The model 18 created by the central data processing unit 5 is stored in a data store 6, wherein the corresponding data may be encrypted for security reasons. FIG. 4 shows a process of a preferred method for encrypted storage of the individual video frames.

The central data processing unit 5 and/or the data store 6 are connected with an application server 9 which processes the determined data for further processing by a user, and which is connected with a user interface 10 or a mobile interface 11. For example, a guard moving around may access the system via the mobile interface 11. In this way, a target can be tracked directly by a law enforcement unit, for example a police command post.

Figure 8:
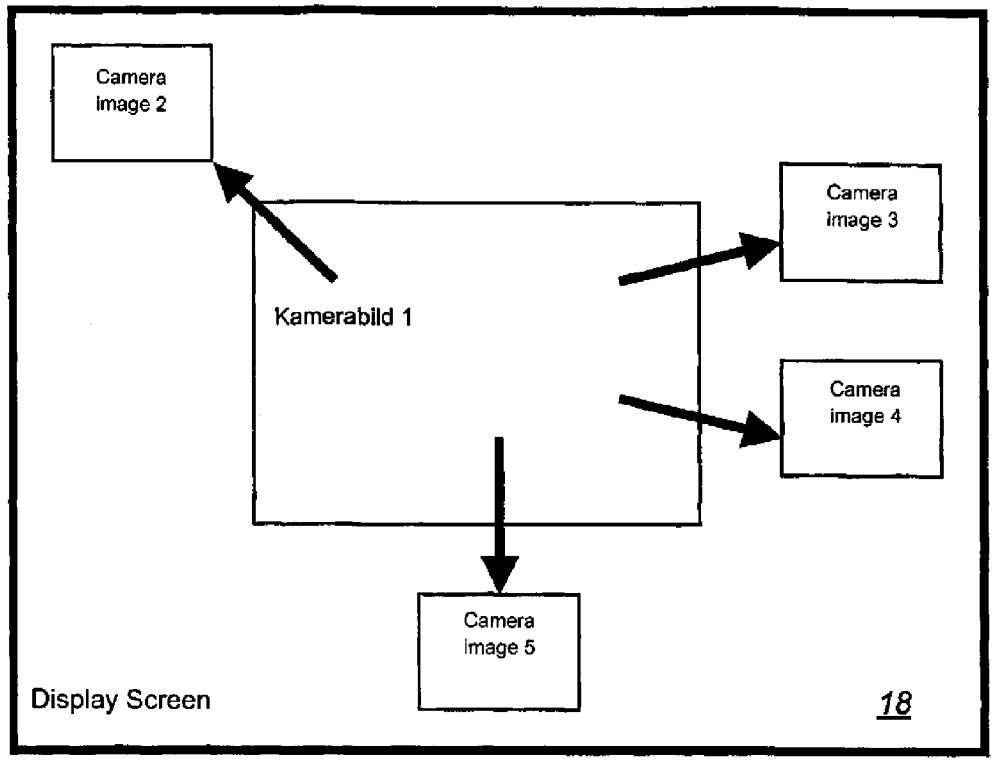
FIG. 8 a preferred screen view of a model.

The user interface 10 transmits the data to a unit for so-called event visualization 12. Such visualization is illustrated in an example in FIG. 8. The video cameras 1, 2, 16 illustrated in FIG. 7 are shown on a symbolically shown display screen, wherein the event visualization 12 displays video signals which include events identified by the method of the invention in the center on an enlarged scale. A target can then be intentionally and intuitively tracked across a region monitored by several video cameras 1, 2, 16. The images from individual video cameras shown in a screen display according to FIG. 8 are shown at the location of a plan view of the monitored region where the video camera 1, 2, 16 is arranged or which is recorded by the video camera.

In one embodiment of the invention where a plan view model and a three-dimensional model 19 are created, both the plan view model and the three-dimensional model 19 may be displayed essentially simultaneously, and the video signal in the plan view model and in the three-dimensional model 19 is selected by selecting one of the at least two digital video signals in the plan view model or in the three-dimensional model 19. For example, by selecting a video camera 1, 2, 16 in the three-dimensional model 19, for example with a mouse or by touching the corresponding area of a touch screen, the image from the same video camera 1, 2, 16 can also be selected in the plan view model and displayed on an enlarged scale in the central view. In this way, a particularly fast and intuitive operation is possible. A large number of video cameras 1, 2, 16 can then be monitored by a small number of users, which also reduces the training time for the users.

Figure 9:
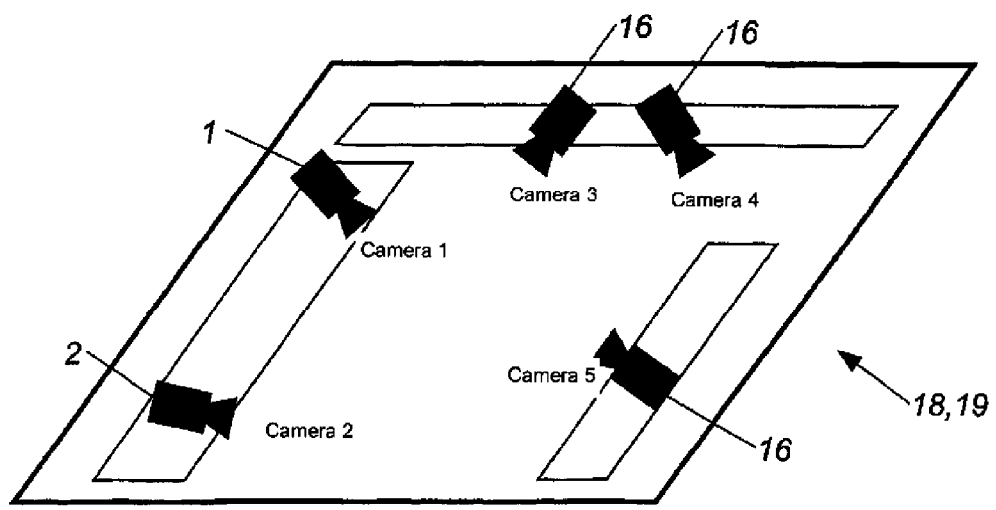
FIG. 9 a preferred diagram of a three-dimensional model of a video camera arrangement according to the invention.

In addition, a unit 13 for visualizing a three-dimensional view or a three-dimensional model 19 of the monitored region is connected to the user interface 10. FIG. 9 shows such an exemplary diagram. In this way, the user can quickly and intuitively orient himself in a monitored room. This is particularly advantageous and important in video camera arrangements and security systems where a very large number of video cameras 1, 2, 7, 16 needs to be monitored by a limited number of personnel, for example when using personnel which is insufficiently familiar with the layout, for during police operations for fighting crime.

In addition, a unit 14 for statistical and/or forensic analysis of the determined data can be connected to the user interface 10. This offers another possibility to create awareness for extraordinary or conspicuous events or behavior patterns.

In a modification of the aforedescribed methods of the invention, at least two digital video signals which are each arranged in an at least partially overlapping recording region 15 may be combined to a model 18 of all the recording regions 15 described by the video signals, wherein the model 18 is outputted, and more particularly displayed. Preferably, the model 18 is created as a three-dimensional model 19. A calibration of the individual video cameras 1, 2, 7, 16 is advantageous for combining the video signals acquired by the individual video cameras 1, 2, 7, 16, and in particular for combining the information determining if regions of an image are associated with the background region and/or the foreground region, and for tracking detected objects across the recording regions 15 covered by the several video cameras 1, 2, 7, 16. In addition, a global coordinate system is required for correlating the individual video signals and/or the data extracted obtained from these video signals in a single model. A user of such video camera arrangement can thereby quickly and intuitively navigate in a video-monitored region, wherein the user always obtains those data which are most probable of greatest interest for the user.

The invention also relates to a security system which includes the video camera arrangement of the invention and/or applies a method according to the invention, wherein such security system further selects at least one sensor from the group: light barrier, motion sensor, impact noise sensor, vibration sensor, contact sensor and infrared sensor. Preferably, the at least one sensor may be connected to the central data processing unit, so that the data obtained by the sensors can also be taken into account when creating the model.

Additional embodiments according to the invention only include a portion of the aforedescribed features, wherein each combination of features, in particular also from different described embodiments, may be contemplated.

The invention claimed is:

1. A method for identifying movement patterns in a first digital video signal which comprises individual digital images recorded with a plurality of cameras, said digital images arranged at least indirectly in form a sequence, comprising the steps of:
   in a central data processing unit, analyzing the first digital video signal in real-time,
   assigning a predetermined number of first markings to at least one position-changing foreground region in a first recorded individual image,
   determining a relative movement of the first markings between the first recorded individual image and a subsequent second recorded individual image,
   associating with each moved first marking a predetermined first environment in the second recorded individual image in one-to-one correspondence,
   applying in the so-processed second recorded individual image a predetermined number of second markings to the at least one first position-changing foreground region or to at least one second position-changing foreground region, or both, wherein at least one of the first and second markings are arranged in form of a raster pattern,
   removing the second markings arranged within intersecting regions of a predetermined number of intersecting first environments,
   determining the relative movements of the first and second markings between the second recorded individual image and a subsequent third recorded individual image, and outputting via a user interface to at least an event representation display the relative movements of the first markings or the second markings, or both, as a first movement pattern.

2. The method of claim 1, wherein the raster pattern is uniformly distributed or distributed with a predetermined weighting.

3. The method of claim 1, wherein the relative movements of at least one of the first and second markings are determined by determining or estimating an optical flow in the first video signal.

4. The method of claim 3, wherein determining or estimating is performed with an optical-flow-tracker.

5. The method of claim 3, wherein a Horn-Schunk method or a Kanade-Lucas-Tomasi method.

6. The method of claim 1, wherein the first environment is formed as a rectangle, a square, or a sectional plane of a cone.

7. The method of claim 6, wherein the sectional plane of a cone is a circle or an ellipse.

8. The method of claim 6, wherein the first environment is weighted.

9. The method of claim 1, further comprising the steps of:
subdividing at least the second recorded individual image into segments having a predetermined arrangement with a predetermined shape and size,
evaluating at least the first movement pattern within each segment, and
determining a segment movement pattern for each segment.

10. The method of claim 9, further comprising the step of determining at least one first main movement pattern from the first movement pattern or from the segment movement pattern, or both.

11. A computer program product embodied on a non-transitory data carrier and including software code segments, which when loaded into a memory of a computer and executed on the computer, causes the computer to perform the method steps of claim 1.

* * * * *